US008954503B2

(12) United States Patent
Bosworth et al.

(10) Patent No.: US 8,954,503 B2
(45) Date of Patent: Feb. 10, 2015

(54) IDENTIFY EXPERTS AND INFLUENCERS IN A SOCIAL NETWORK

(75) Inventors: Andrew Garrod Bosworth, San Mateo, CA (US); Michael Patrick Murphy, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 148 days.

(21) Appl. No.: 13/040,129

(22) Filed: Mar. 3, 2011

(65) Prior Publication Data

US 2012/0226748 A1 Sep. 6, 2012

(51) Int. Cl.
*G06F 15/16* (2006.01)
*G06Q 10/10* (2012.01)

(52) U.S. Cl.
CPC .................................. *G06Q 10/103* (2013.01)
USPC .......................................................... 709/204

(58) Field of Classification Search
CPC ........................... G06F 15/16; H04L 29/08072
USPC .......................................................... 709/204
See application file for complete search history.

(56) References Cited

U.S. PATENT DOCUMENTS

| 8,204,952 | B2 * | 6/2012 | Stremel et al. ................. 709/213 |
| 2004/0172415 | A1 | 9/2004 | Messina |
| 2004/0249700 | A1 | 12/2004 | Gross |
| 2007/0198510 | A1 | 8/2007 | Ebanks |
| 2008/0250332 | A1 * | 10/2008 | Farrell et al. .................. 715/753 |
| 2008/0256233 | A1 | 10/2008 | Hall |
| 2009/0144392 | A1 * | 6/2009 | Wang et al. .................... 709/217 |
| 2009/0307138 | A1 | 12/2009 | Steiner |
| 2010/0145777 | A1 | 6/2010 | Ghosh |
| 2011/0320715 | A1 * | 12/2011 | Ickman et al. ................. 711/118 |
| 2012/0151322 | A1 * | 6/2012 | Lindsay et al. ................ 715/234 |
| 2012/0209920 | A1 | 8/2012 | Neystadt |

FOREIGN PATENT DOCUMENTS

| KR | 10-2008-0017685 | 2/2008 |
| KR | 10-2010-0006752 | 1/2010 |

OTHER PUBLICATIONS

International Search Report and Written Opinion for International Application PCT/US2012/027629, Oct. 16, 2012.
U.S. Appl. No. 13/040,158, filed Mar. 3, 2011, Bosworth.
Non-Final Office Action for U.S. Appl. No. 13/040,158, Aug. 30, 2013.
Final Office Action for U.S. Appl. No. 13/040,158, Jun. 13, 2014.

* cited by examiner

*Primary Examiner* — Vivek Srivastava
*Assistant Examiner* — Sibte Bukhari
(74) *Attorney, Agent, or Firm* — Baker Botts L.L.P.

(57) ABSTRACT

On embodiment accesses a set of information comprising one or more elements of information relating to a subject matter, wherein the one or more elements of information have been shared among one or more users of a social-networking system; for each element of information, determines a rate of sharing of the element of information among the one or more users and identifies one or more first users who cause the rate of sharing of the element of information to increase; and identifies one or more influencers associated with the subject matter from the one or more first users identified for each element of information.

22 Claims, 6 Drawing Sheets

IDENTIFY EXPERTS AND INFLUENCERS IN A SOCIAL NETWORK

TECHNICAL FIELD

This disclosure generally relates to identifying experts and influencers in a social network and utilizing the identified experts and influencers for advertising, social grouping, and other suitable purposes.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

SUMMARY

This disclosure generally relates to identifying experts and influencers in a social network and utilizing the identified experts and influencers for advertising, social grouping, and other suitable purposes.

Particular embodiments access a set of information comprising one or more elements of information relating to a subject matter, wherein the one or more elements of information have been shared among one or more users of a social-networking system; for each element of information, determine a rate of sharing of the element of information among the one or more users, and identify one or more first users who cause the rate of sharing of the element of information to increase; and identify one or more influencers associated with the subject matter from the one or more first users identified for each element of information.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, This disclosure may be practiced without some or all of these specific details. In other instances, well known process steps and/or structures have not been described in detail in order not to unnecessarily obscure This disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
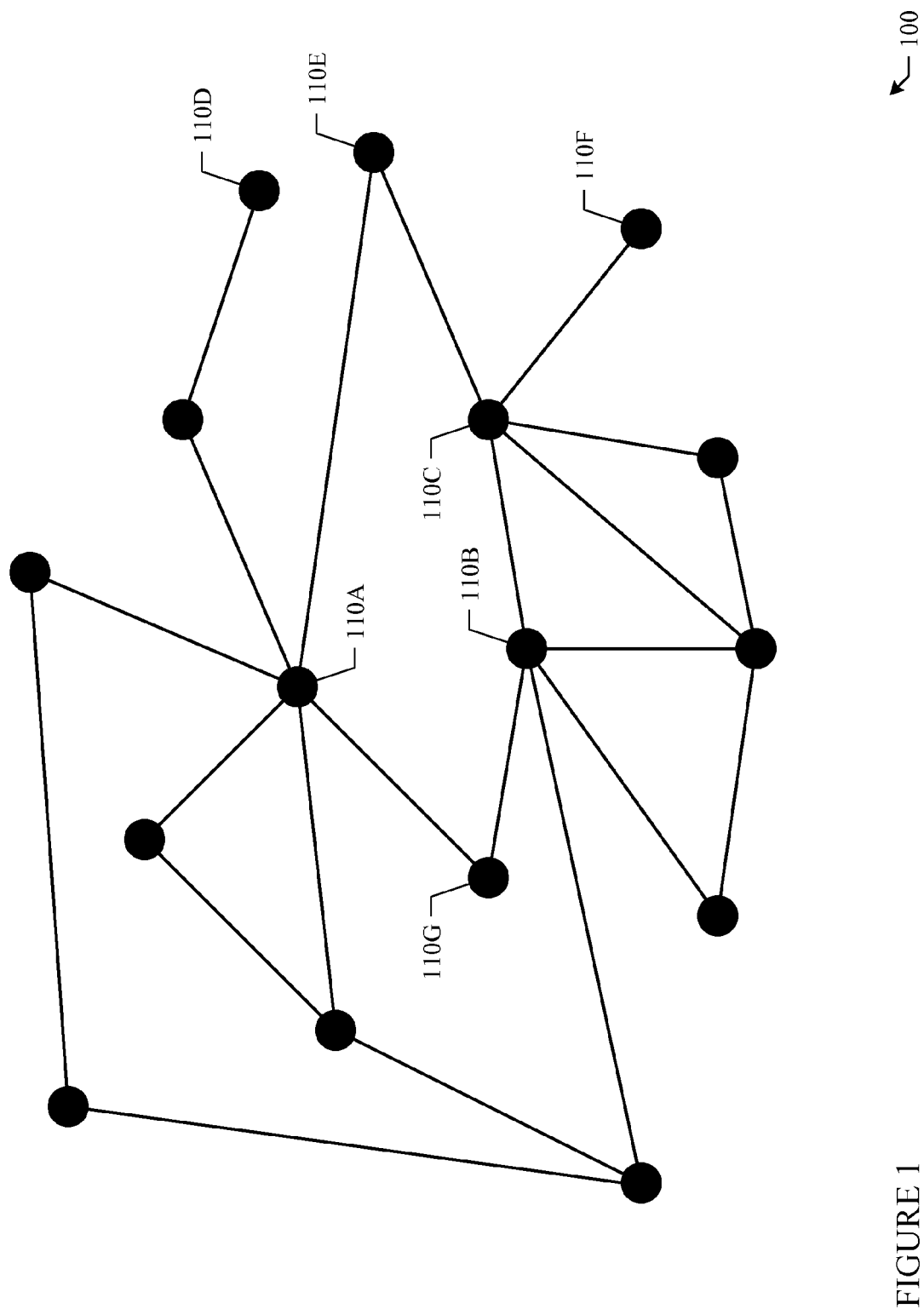
FIG. 1 illustrates an example social network.

Members of a social network may be connected by various types of interdependency or relationships. FIG. 1 illustrates an example social network 100 as a graphical representation of its members and the connections between the individual members. In FIG. 1, each member of social network 100 is represented as a node, and each connection between two members is represented as an edge linking the two corresponding nodes. Note that only a few nodes and edges are included in FIG. 1 to simplify the discussion. In practice, a social network may include any number of members and there may be any number of connections between the individual members.

In more recent years, social networks have taken advantage of the Internet. There are social-networking systems existing on the Internet in the form of social-networking websites. Such social-networking websites enable their members, who are commonly referred to as website users, to perform various social activities. Thus, social network 100 may be an example social-network system implemented as a social-networking website. In this case, the nodes represent the website users and the edges represent the connections between the individual users. Within a social-networking system (e.g., social network 100), some users may be connected with many other users, whereas some users may be connected with only a few other users. For example, in FIG. 1, nodes (i.e., users) 110A, 110B, 110C are each connected to many other nodes (i.e., users), whereas nodes (i.e., users) 110D, 110E, 110F, 110G are each connected to a few other nodes (i.e., users).

When a first user is directly connected to a second user, the first user is considered one-hop away from the second user. For example, in FIG. 1, user 110A and 110G are directly connected, and thus, user 110A is considered one-hop away from user 110G, and vice versa. When a first user is connected to a second user through a third user, the first user is considered two-hop away from the second user. For example, in FIG. 1, user 110A and 110B are connected through user 110G, and thus, user 110A is considered two-hop away from user 110B, and vice versa. And so on.

In particular embodiments, within a social-networking system, some users may be considered as "experts" and some users may be considered as "influencers". An expert, in general, is a person with extensive knowledge or ability based on education, research, experience, or occupation in a specific field. Often, an expert is widely recognized as a reliable source of technique or skill, and his/her peers or the public in a specific field accords an expert's faculty for judging or deciding rightly, justly, or wisely with authority and status. On the other hand, an influencer, in general, is a person who has the power to sway or influence others based on, for example, prestige, wealth, ability, or position. Usually, an influencer's ability to influence others is with respect to a specific field or subject matter as well. In connection with marketing, a form of marketing, called "influencer marketing" or "influence marketing", has emerged from a variety of recent practices and studies, in which marketing focus is placed on specific key individuals or types of individuals (i.e., the influencers) rather than the target market as a whole. It identifies the individuals that have influence over potential buyers, and orients marketing activities around these influencers. Influencers may be potential buyers themselves, or they may be third parties who exist either in the supply chain (e.g., retailers, manufacturers, etc.) or who are value-added influencers (e.g., journalists, academics, industry analysts, professional advisers, etc.).

In particular embodiments, within a social-networking system, a specific user may be both an expert and an influencer, or an expert but not an influencer, or an influencer but not an expert, or neither. Moreover, in particular embodiments, an expert or influencer is identified with respect to a specific field, product, type of product, subject matter, or topic. A user may be an expert in one field and an influencer in another field. A user may be an expert or influencer on one type of product or subject matter or in one field but not on another type of product or subject matter or in another field. For example, a user may be an expert or influencer with respect to automobiles, but not an expert or influencer with respect to digital cameras.

In particular embodiments, within a social-networking system, those users who are experts and those users who are influencers are identified either manually or automatically, and the identified experts and influencers may be utilized for social networking, advertising, marketing, or other suitable purposes. In particular embodiments, experts and influencers may be identified for any subject matter, field, or type of product, and each subject matter, field, or type of product may have any number of experts and influencers. The field, subject matter, or type of product may be set at any granularity. For example, experts and influencers may be identified for all types of digital cameras, or only for single-lens reflex (SLR) digital cameras, or only for SLR digital cameras made by Canon, Inc., or only for full frame SLR digital cameras made by Canon, Inc.

Identify Experts and Influencers

Particular embodiments may manually identify those users in a social-networking system who are experts and those users in the social-networking system who are influencers in specific fields or with respect to specific subject matters or products. For each given field, type of product, or subject matter, particular embodiments may survey the users of the social-networking system and ask the users to identify specific users of the social-networking system whom the surveyed users consider as experts and/or influencers in the given field or with respect to the given subject matter or type of product. For example, with respect to SLR digital cameras, each surveyed user may be asked to provide answers to some of the following questions: (1) which users would you ask for advice when you want to purchase a SLR digital camera; (2) which users would you ask for advice when you have problems with or questions about your SLR digital camera; (3) which users would you ask for advice when you want to know the specific features of different models of SLR digital cameras; (4) which users would you ask for advice if you want to determine which SLR digital camera is especially suitable to your needs; or (5) which users' opinions concerning SLR digital cameras do you trust the most. The survey answers may be analyzed to identify those users who are experts and those users who are influencers on SLR digital cameras. For example, if a large number of the surveyed users have answered that they would ask "user A" for advice or help when they have difficulties with their SLR digital cameras or when they want to learn how to use a specific feature of their SLR digital cameras, then "user A" may be considered an expert on SLR digital cameras. Similarly, if a large number of the surveyed users have answered that they would ask "user B" for advice when they want to purchase SLR digital cameras or when they want to know which specific SLR digital cameras are most suitable to their needs, then "user B" may be considered an influencer on SLR digital cameras.

Alternatively or in addition, particular embodiments may automatically identify those users in a social-networking system who are experts and those users in the social-networking system who are influencers in specific fields or with respect to specific subject matters or product types. Particular embodiments may track and analyze user online activities over some periods of time to identify the experts and the influencers on specific subjects matters or product types.

There are many channels or means for a network user, and more specifically a social-networking user, to inject various elements of information into a computer network (e.g., the Internet). The information may have any suitable format (e.g., text, image, audio, video, etc.). For example, the user may post messages in blogs or on online message boards, publish posts, articles, images, audios, or videos at websites, send emails, instant messages, or tweets, etc. The user who injects an element of information into the network may or may not be the original author of that element of information. For example, one user may compose an article himself and post the article at one website, and another user may repost the same article at another website. The first user is the original author of the article, while the second user is not. Yet, both users have injected the same article onto the Internet so that there are two instances of the same article available at two different websites. In particular embodiments, when considering the information injected into a computer network by a specific user, for some analysis, it is irrelevant whether the user is the original author of the information, whereas for other analysis, whether the user is the original author of the information is taking into consideration.

Figure 2:
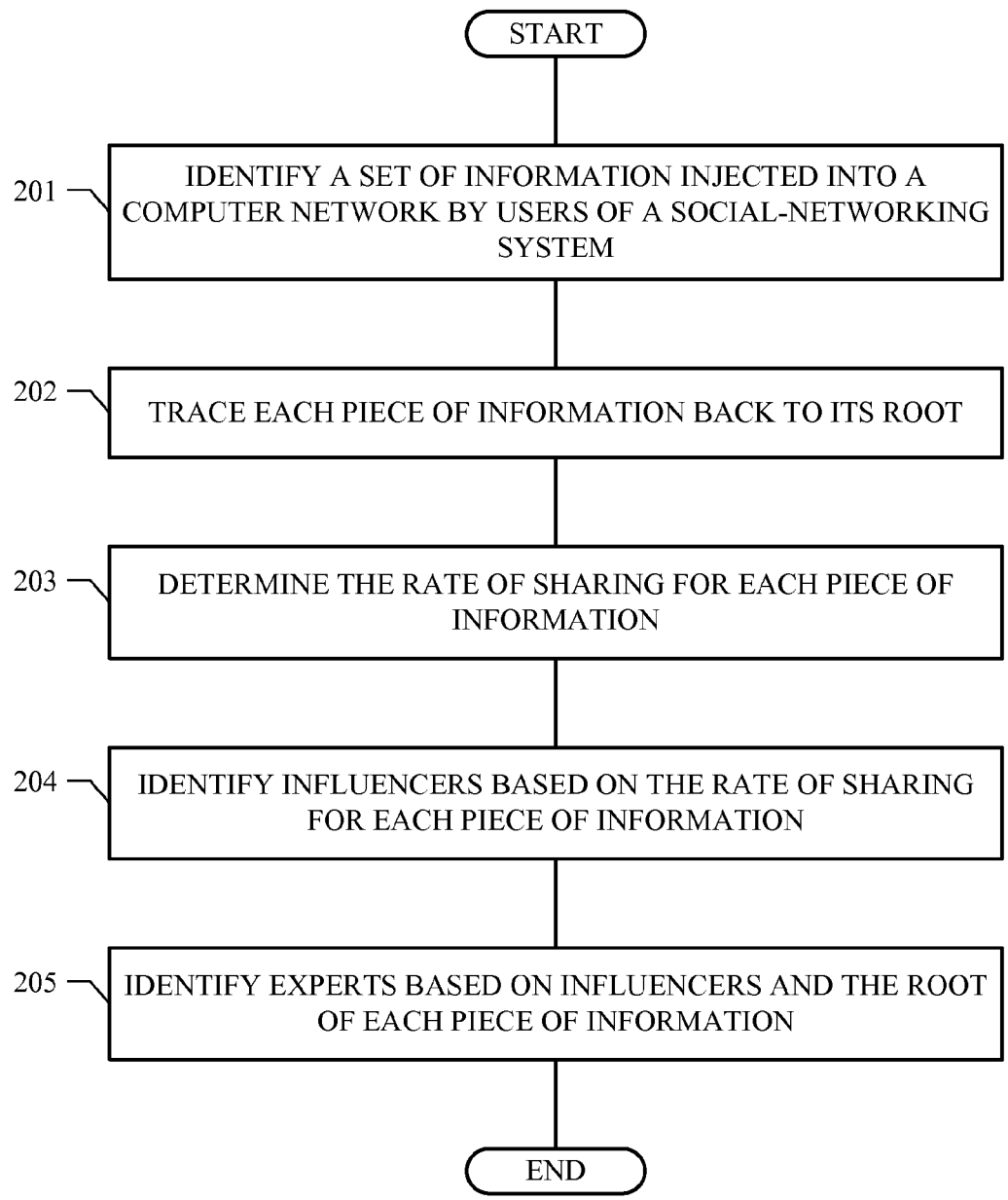
FIG. 2 illustrates an example method for identifying experts and influencers in a social-networking system.

FIG. 2 illustrates an example method for identifying experts and influencers in a social-networking system. Particular embodiments may categorize the information (e.g., messages, posts, tweets, links, emails, etc.) injected into a computer network (e.g., the Internet) by the users of a social-networking system based on the subject matters of the information to determine one or more sets of information, as illustrated in STEP 201. For example, all information relating to SLR digital cameras may be grouped together, regardless of the actual formats of the individual elements of information (e.g., a blog post, a tweet, a status update, an associated tag, and an article, each about a SLR digital camera, are grouped together). Similarly, all information relating to MP3 players may be grouped together, and all information relating to cellular telephones may be grouped together. The categorization of the information may be done at any granularity. For example, with respect to digital cameras, in one case, all information concerning digital cameras may be grouped together. In another case, all information concerning SLR digital cameras may be grouped together, while all information concerning point-and-shoot digital cameras may be grouped together. In a third case, all information concerning 35 mm SLR digital cameras may be grouped together, while all information concerning medium-format digital cameras may be grouped together.

In particular embodiments, a group of information concerning the same subject matter may be referred to as a "set" of information. That is, a set of information may include one or more elements of information, in various formats (e.g., post, message, article, image), that relate to the same subject matter (e.g., a type of product, a product, a topic, etc.). Particular embodiments may analyze a set of information to identify one or more experts and one or more influences with respect to the subject matter associated with the set of information. Note that there may be multiple set of information with respect to multiple subject matters, and each set of information may be analyzed to identify one or more experts and one or more influences with respect to the specific subject matter associated with that set of information. In particular embodiments, STEPS 202-205 may be used to identify experts and influencers with respect to the subject matter associated with a specific set of information. Since a set of information is analyzed to identify experts and influencers with respect to the subject matter of the set of information, in particular embodiments, how a set of information is obtained (e.g., what specific elements of information are included in the set of information, what subject matters the elements of information in the set relate to) determines for which subject matter the experts and influencers are identified.

In particular embodiments, given a set of information, there may be one or more elements of information. As explained above, each element of information may have been injected into a computer network multiple times. For example, for an article, "user A" may be the original author of the article or the person who has originally identified the importance or accuracy of the article and/or initially posts the article at a website. Several users may read the instance of the article posted by "user A", and among them, "user B1" may repost the article at another website, while "user B2" and "user B3" may post comments or replies to the article, and "user B4" may forward the article privately (e.g., via instant messages) to several of his social connections. Several users may read the instance of the article posted by "user B1", and among them, "user C1" and "user C2" may repost the article at two other (i.e., a third and a fourth) websites, while "user C3", "user C4", and "user C5" may post comments or replies to the article, and "user C6" and "user C07" may forward the article privately (e.g., via emails) to their social connections. And so on. Thus, for each element of information included in the set, there may be multiple instances of that same element of information included in the set of information.

For each element of information included in the set, particular embodiments may attempt to trace its progression (i.e., through posting, reposting, and sharing) backward (e.g., in time) to its root (i.e., the first instance the element of information is injected into the system and shared among the users), or as close to its root as possible, as illustrated in STEP 202. In the above example, the instance of the article reposted by "user C1" may be traced back to the instance of the article reposted by "user B1", which may in turn be traced back to the instance of the article originally posted by "user A". At this point, the root of the article has been found. Often, when an element of information is injected into a computer network, a timestamp is associated with the element of information, indicating the date and time the element of information is published or transmitted. In particular embodiments, given several instances of the same element of information in the set of information, the instance that has the oldest timestamp may be considered the root of the element of information.

In general, the user who has initially injected an element of information (e.g., posts a message, status update, or article, or sends an email or tweet) into the network is likely to be the original author of that element of information or someone who has found the element of information to contain relatively important or accurate content (e.g., someone who has identified some accurate or important information regarding a subject matter). In the above example, suppose that the article is a review of several popular models of the SLR digital cameras currently on the market. The original author of the article, "user A", is very likely to have certain amount of knowledge and experience with respect to SLR digital cameras in order to be able to write such a review. If, when the individual elements of information of a set are traced back to their respective roots, several elements of information are traced back to the same user as their original author, then this may suggest that this particular user may have extensive knowledge and experience with respect to the subject matter associated with the set, as the user is able to compose many messages, posts, or articles on the subject matter. Consequently, given a set of information relating to a specific subject matter, if a significant number of elements of information are traced back to the same user as their roots (i.e., as their author or as the person who has originally identified their importance or accuracy), then particular embodiments may consider that user as an expert with respect to the subject matter associated with the set. In particular embodiments, suppose there are n elements of information in the set of information. In this case, back tracing each element of information to its root may result in a total of n potential experts (i.e., one corresponding to each element of information in the set), although some elements of information may be traced back to the same potential expert. Particular embodiments may identify the experts with respect to the subject matter associated with the set from the n potential experts.

Particular embodiments may determine how many elements of information are traced back to the same potential expert. In particular embodiments, the more elements of information are traced back to a specific potential expert, the more weight is given to that potential expert. Alternatively, in particular embodiments, each potential export may be assigned a score. The more elements of information are traced back to a specific potential expert, the higher score that potential expert has. Over time, the scores of the potential experts may be examined, and the ones with the higher scores may be identified as actual experts.

Alternatively, in particular embodiments, a predefined threshold may be used to select the experts with respect to the subject matter associated with the set, such that for any given user, if the number of elements of information traced back to the user as their roots (i.e., as their author or as the person who has initially recognized the importance or accuracy of the elements of information and thus shared these elements of information) is greater than or equal to the threshold, then particular embodiments may consider the user as an expert with respect to the subject matter associated with the set. The threshold may be determined and defined based on the requirements of the application. Note that there may be multiple users identified in such a manner as the experts with respect to the subject matter associated with the set. Alternatively, in particular embodiments, the users may be ranked based on the total number of elements of information traced back to them as their roots. The top-ranked number of users may be considered as experts with respect to the subject matter associated with the set.

For each element of information in the set of information, particular embodiments may examine and analyze the rate of sharing of that element of information, as illustrated in STEP 203. In the above example, when "user A" first posts the first instance of the example element of information, some users may read it, some users may respond to it (e.g., posting comments on it), some users may forward it to their acquaintances (e.g., sharing the element of information with specific people), and some users may repost it elsewhere (e.g., sharing the element of information with the general public). Similarly, when "user B1" reposts the second instance of the same example element of information, again, some users may read it, some users may respond to it, some users may forward it to their acquaintances, and some users may repost it elsewhere. And so on. Through this process, the same element of information is propagated throughout the computer network (e.g., the Internet) as a result of the network users sharing the element of information with other network users.

Figure 3:
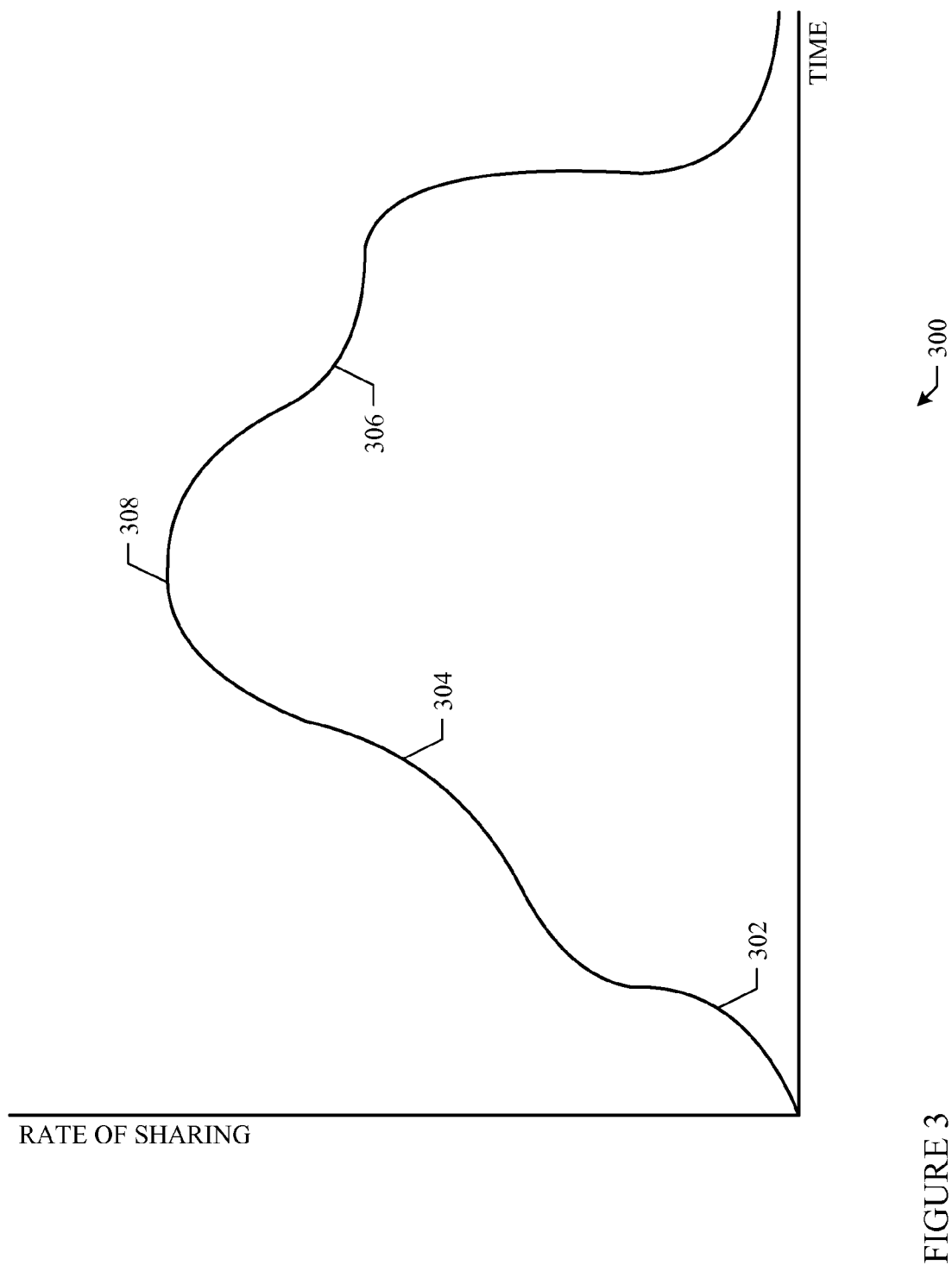
FIG. 3 illustrates an example of the rate of sharing for an element of information.

Particular embodiments may examine the rate an element of information is shared over time. FIG. 3 illustrates an example of the rate of sharing for an element of information over time, represented as a curve 300. Typically, when an element of information is first injected into the network, its rate of sharing first starts slow but gradually increases over time to reach a high level at some point (e.g., near 308). However, the rate of sharing does not usually increase constantly (e.g., in a straight line). Instead, at several points (e.g., 302, 304) along curve 300, the rate of sharing may increase significantly more (i.e., having sudden jumps or having significant local increases). Then, as time passes, the content of the information becomes old, and its rate of sharing gradually decreases. However, again, the rate of sharing does not usually decrease constantly (e.g., in a straight line). Instead, as illustrated in FIG. 3, at several points (e.g., 306) along curve 300, the rate of sharing may locally increases (i.e., relative to the segments of the curve near the points) even though the overall rate of sharing decreases. These significant local increases in the rate of sharing are likely due to that the element of information has been shared (e.g., reposted or forwarded) by individual users who may each have a relatively large audience that views the user's postings at various points in time. Such a user is more likely to have a stronger influence on the other users than another user who has a relatively small audience that views his postings.

To locate these users who are likely to have stronger influences on the other users, particular embodiments may examine the rate-of-sharing curve (e.g., curve 300) of each element of information and locate those points along the curve that the rate of sharing locally increases significantly. The users who have caused these significant local increases may be indentified as influencers for the element of information.

To locate the points on a rate-of-sharing curve (e.g., curve 300) where the rate of sharing for a corresponding element of information locally increases significantly, particular embodiments may calculate the first-order derivative of the rate-of-sharing curve, which indicates the rate of changing in the curve. Those points on the rate-of-sharing curve where the corresponding first-order derivative indicates higher rates of changing, and more specifically, higher increase in the rate of sharing, in the curve are the points on the curve where the rate of sharing for the corresponding element of information locally increases. When the rate of sharing increases locally at a specific point on the curve, the slope of the first-order derivate at that point is more positive, especially in comparison to the slopes of the first-order derivate at other points near that point. In fact, the more positive the slope of the first-order derivate is at a specific point on the curve, the more the rate of sharing increases at that point. In particular embodiments, those users who have shared the element of information at these points on the curve where the slopes of the first-order derivate of the curve is sufficiently more positive than the slopes of the first-order derivate of the curve at other nearby points (e.g., above a predefined threshold or the top n points where the slopes of the first-order deviate are the greatest) may be considered influencers with respect to the subject matter of the element of information, as illustrated in STEP 204. For example, in FIG. 3, the three users who share the example element of information at points 302, 304, 306 may be considered influencers with respect to the subject matter of the example element of information, because the first-order derivative of curve 300 (i.e., the rate of sharing curve) at points 302, 304, 306 has positive slopes.

Consequently, in particular embodiments, given a set of information relating to a specific subject matter, suppose that there are n elements of information in the set of information. In this case, by examining the rate of sharing for each element of information, a list of one or more potential influencers may be identified for each element of information, as described above. Since there are n elements of information in the set, there may be n lists of potential influencers identified, one corresponding to each element of information. Note that the potential influencers in the n lists may overlap, as the same potential influencer may be identified from multiple elements of information. In particular embodiments, the influencers with respect to the subject matter of the set may be selected from the n lists of potential influencers.

Particular embodiments may determine how many lists of potential influencers to which the same potential influencer belongs. In particular embodiments, the more lists of potential influencers to which a specific potential influencer belongs, the more weight is given to that potential influencer. Alternatively, in particular embodiments, each potential influencer may be assigned a score. The more lists of potential influencers to which a specific potential influencer belongs, the higher score that potential influencer has. Over time, the scores of the potential influencers may be examined, and the ones with the higher scores may be identified as actual influencers.

Alternatively, in particular embodiments, if a user is identified as an influencer based on the rates of sharing of a significant number of elements of information (e.g., by determining the rates of sharing for these elements of information and then calculating their respective first-order derivatives), then particular embodiments may consider that user as an influencer with respect to the subject matter associated with the set. In particular embodiments, a predefined threshold may be used to select the influencers with respect to the subject matter associated with the set, such that for any given user, if the user is indentified as an influencer based on the rates of sharing of the number of elements of information that is greater than or equal to the threshold, then particular embodiments may consider the user as an influencer with respect to the subject matter associated with the set. The threshold may be determined and defined based on the requirements of the application. Note that there may be multiple users identified in such a manner as the influencers with respect to the subject matter associated with the set. Alternatively, in particular embodiments, the users may be ranked based on the total number of elements of information based on which they are identified as influencers. The top-ranked number of users may be considered as influencers with respect to the subject matter associated with the set.

As described before, an influencer on a subject matter may or may not also be an expert on the same subject matter. Suppose a given user, "user X", is identified as an influencer on a subject matter (e.g., by analyzing the rates of sharing of the elements of information in a set of information relating to the subject matter) but not an expert on the same subject matter (e.g., not enough elements of information in the set of information relating to the subject matter are traced back to "user X" as their original author). This suggests that: (1) "user X" have shared a significant number of elements of information relating to the subject matter; and (2) when "user X"

shares these elements of information, a significant number of other users view the elements of information. However, since "user X" is not also an expert on the subject matter, it suggests that "user X" may not be the original author of the many elements of information on the subject matter that he has shared, which in turn suggests that "user X" has obtained these elements of information from another user.

There are several possibilities as to from which type of user "user X" has obtained these elements of information. First, it is possible that "user X" has obtained these elements of information directly from their original authors, who are potential experts on the subject matter of the elements of information. Second, it is possible that "user X" has obtained these elements of information from other influencers on the subject matter of the elements of information. Finally, it is possible that "user X" has obtained these elements of information from other users who are neither experts nor influencers on the subject matter of the elements of information.

As described above in connection with STEP 202, in particular embodiments, each element of information in a set of information relating to a specific subject matter may be traced backward, along the process of its sharing among the network users, to its root or as close to its root as possible. Suppose several users, including, for example, "user X", "user Y", and "user Z", are each identified as an influencer on the subject matter. Depending on at which points along the sharing process each influencer has shared the element of information, particular embodiments may determine how close each influencer is to the root (i.e., the original author or the original person who has identified the element of information to be important) of the element of information. For example suppose "user X" has shared the element of information before "user Y", who in turn has shared the element of information before "user Z". In FIG. 3, "user X" may be the user at point 302, "user Y" may be the user at point 304, and "user Z" may be the user at point 306. Within a social-networking system, "user X" is likely to be more closely connected to the original author or the person who initially has recognized the importance of the element of information than "user Y", who in turn is likely to be more closely connected to the original author of the element of information than "user Z", since "user X" is able to obtain and share the element of information before "user Y", who in turn is able to obtain and share the element of information before "user Z".

Thus, by backward tracking the sharing processes of the elements of information in the set of information, particular embodiments are able to determine how closely each influencer is to the roots of the elements of information. Since the original authors or the persons who originally have identified the importance or accuracy of the elements of information are potential experts on the subject matter of the set of information, particular embodiments are able to determine how closely each influencer is connected to an expert. Particular embodiments may categorize the influencers (e.g., into tiers) based on their respective degrees of closeness to the experts. In the above example, "user X" may be a first-tier influencer since he is the closest to an expert among the three influencers; "user Y" may be a second-tier influencer; and "user Z" may be a third-tier influencer since he is the farthest from the expert among the three influencers.

Sometimes, it may not be possible to trace specific elements of information back to their respective roots (i.e., their respective authors) due to, for example, insufficient data. For example, the very first instance that an element of information is shared (e.g., posted) by its original author may not be available in the set of information. In this case, the original author of the element of information cannot be identified by tracing backward (e.g., in time) the sharing process of the element of information using the instances of the element of information available in the set of information. On the other hand, one or more influencers may be identified by analyzing the rates of sharing of each element of information. Given an element of information, an influencer who is closest to the root, and thus closest to the original author, of the element of information may be closely connected to the original author of the element of information within a social-networking system, because it is likely that this influencer has obtained the element of information directly from its original author. Thus, if it is not possible to trace specific elements of information back to their respective roots, particular embodiments may identify those influencers who are closest to the respective roots of the elements of information. And then, particular embodiments may examine the social-networking system to identify those users who are directly connected to (i.e., one hop from) or who are closely connected to (e.g., within two or three hops from) the influencers who are closest to the roots of the elements of information. Some of these users may be identified as experts. Particular embodiments may examine the network activities of these selected users to determined whether they are the original authors of the individual elements of information (e.g., they have posted the earliest instances of the elements of information). If a selected user is the original author or the person who has originally recognized the importance or accuracy of a significant number (e.g., greater than or equal to a predefined threshold) of elements of information in the set, particular embodiments may identify that selected user as an expert on the subject matter of the set of information, as illustrated in STEP 205.

As described above, in particular embodiments, the information injected into a computer network by the users of a social-networking system may be categorized into one or more sets of information based on the subject matters of the information. In particular embodiments, the steps illustrated in FIG. 2 may be applied to each set of information to identify one or more experts and/or influencers with respect to the subject matter of that set of information. Consequently, it is possible that some experts or influencers may be associated with only a few subject matters of a few sets of information or only one subject matter of one set of information, while other experts or influencers may be associated with many subject matters of may sets of information or even all the subject matters of all the available sets of information. In particular embodiments, if an expert or influencer is associated with many or even all the subject matters, he/she may be considered a power expert or a power influencer.

Utilize Experts and Influencers

The method illustrated in FIG. 2 may be used to identify experts and/or influencers on various subject matters or products or in various fields. Given a specific subject matter, type of product, product, or field, once its experts and/or influencers have been identified, particular embodiments may utilize them for various purposes.

Figure 4:
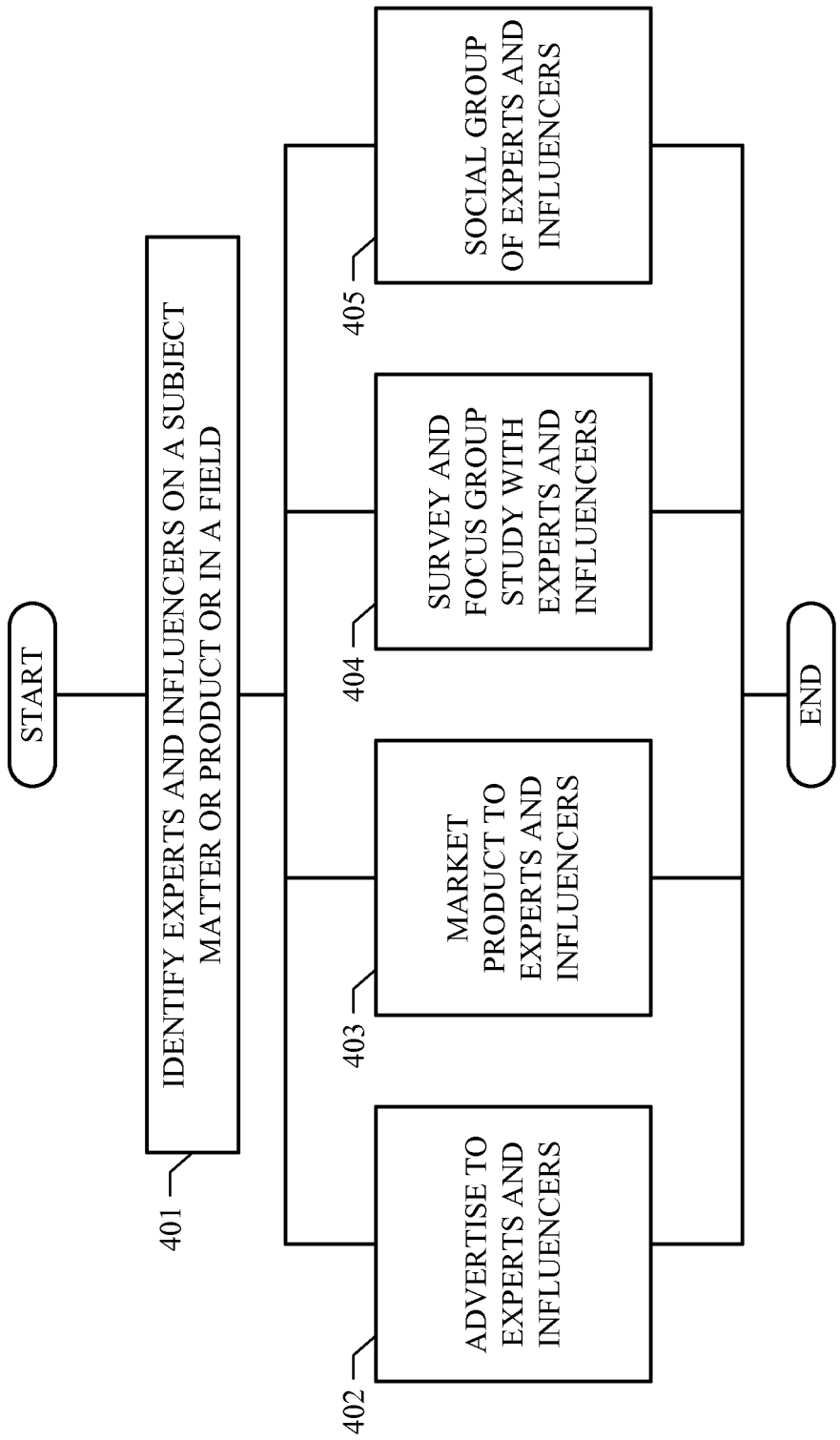
FIG. 4 illustrates an example method for utilizing experts and influencers with respect to a subject matter, product, or field for various purposes.

FIG. 4 illustrates an example method for utilizing experts and influencers on a subject matter or product or in a field for various purposes. Given a specific subject matter, type of product, product, or field, particular embodiments may identify one or more experts and/or one or more influencers using, for example, the method illustrated in FIG. 2, as illustrated in STEP 401.

Particular embodiments may advertise to experts and influencers differently from advertising to users who are not experts and influencers, as illustrated in STEP 402. Often, an online advertiser is charged for advertising to users based on some type of charging model. For example, with cost per mille (CPM) or cost per thousand (CPT), an advertiser is charged based on showing an advertisement to each thousand users. With cost per impression (CPI), an advertiser is charged based on each time an advertisement is delivered to a user. Other charging models may include, for example, cost per action (CPA), cost per click through (CPC), cost per lead (CPL), cost per sale (CPS), etc. When advertising a specific product, particular embodiments may charge the advertiser more for advertising to the experts and influencers on the product or the type of product than to non-experts and non-influencers of the product. For example, if the CPI model is used, each time the product advertisement is delivered to an expert of the product, the advertiser may be charged $0.20. Each time the product advertisement is delivered to an influencer of the product, the advertiser may be charged $0.15 or the same amount as the expert. Each time the product advertisement is delivered to a standard user (i.e., non-expert and non-influencer), the advertiser may be charged $0.05 (i.e., an amount lower than the one charging for the experts and influencers). Because the experts and influencers can provide information about the project and influence other users' opinions regarding the product, the advertiser is likely to be willing to pay more for advertising to the experts and influencers of the product.

Particular embodiments may market products, especially new products, to experts and influencers specifically, as illustrated in STEP 403. For example, when a new product first becomes available, its manufacture usually desires the potential buyers to learn more about the product. If the product is made available to the experts of such type of product, the experts may provide reviews, analysis, comparisons, and other types of useful information about the product. If the product is made available to the influencers of such type of products, the influencers may persuade other potential buyers to purchase the product. It may be more effective, and thus more desirable, to make the product available to the experts and influencers than to the standard users (i.e., non-experts and non-influencers). Particular embodiments may provide the experts and influencers of a product to its manufacture so that the manufacture can make the product available to the experts and influencers through suitable means. For example, the manufacture may send product samples to the experts and influencers, or provide other opportunities for the experts and influencers to receive the product. The manufacture may hold a contest with the product as the reward. A number of winners may be randomly selected to receive the product. At the same time, the experts and influencers of the product who have participated in the contest may also be given the product.

Particular embodiments may conduct surveys and focus group studies among the experts and influencers, as illustrated in STEP 404. Given a product, conducting surveys and focus group studies among the experts and influencers of the product may provide more insightful responses and thus better analysis than among the non-experts and non-influencers because the experts and influencers tend to have more knowledge and experience with such type of product. Particular embodiments may provide the experts and influencers of a product to its manufacture so that the manufacture can conduct surveys and focus group studies on the product among some of the experts and influencers.

Particular embodiments may establish social connections among the experts and influencers on a specific subject matter or in a specific field, as illustrated in STEP 405. The experts and influencers on a specific subject matter or product or in a specific field may have common interests. Particular embodiments may notify an expert or influencer on a specific subject matter or in a specific field of other experts and/or influencers on the same subject matter or in the same field that belong to the same social-networking system so that he has the choice of establishing social connections with the other experts and/or influencers. Particular embodiments may establish a social group for a specific subject matter or field and invite the experts and influencers of the subject matter or field to join the group.

Network Environment

Figure 5:
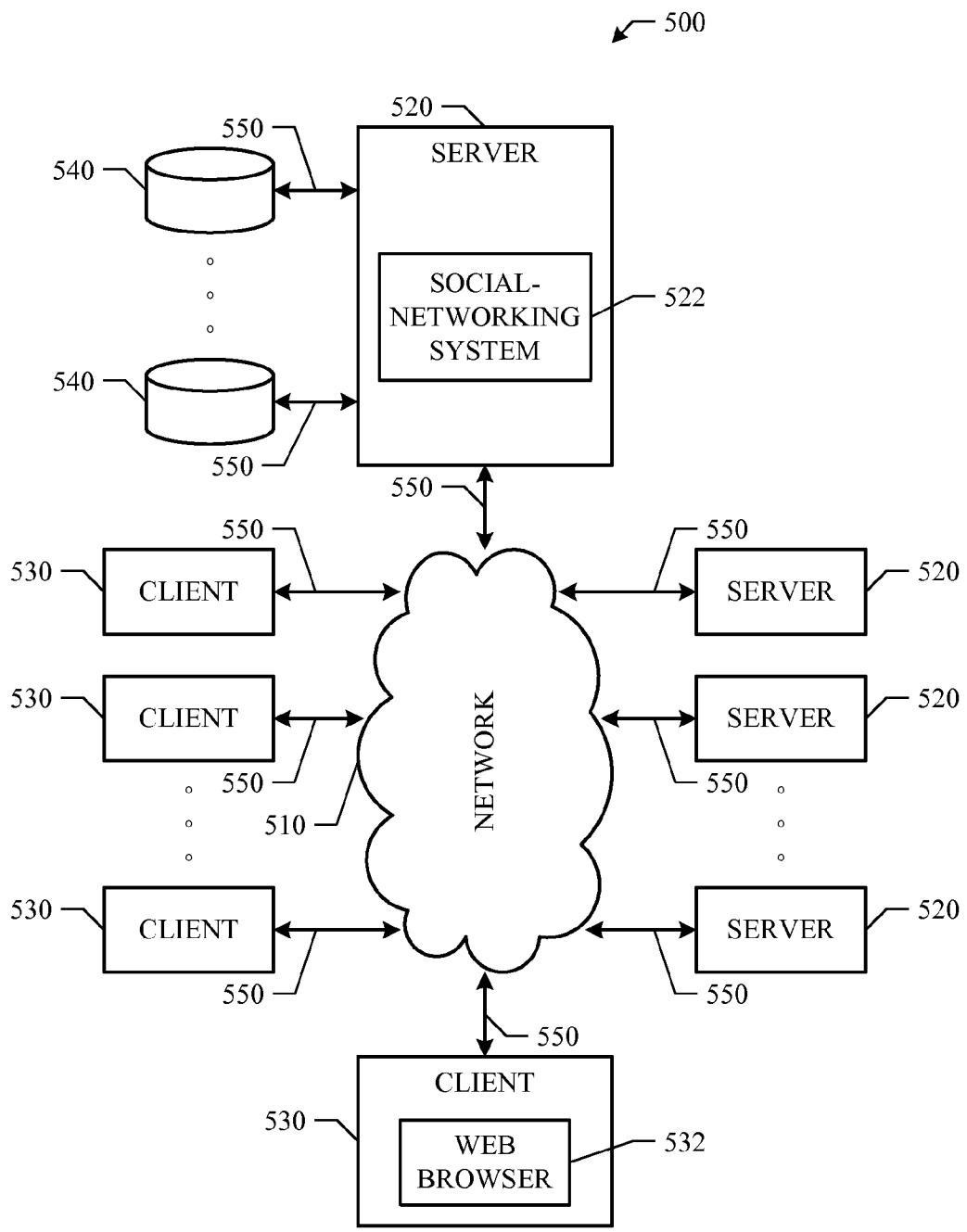
FIG. 5 illustrates an example network environment.

Particular embodiments may be implemented in a network environment. FIG. 5 illustrates an example network environment 500. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores. In particular embodiments, a social-networking system 522 may be hosted on a server 520 (e.g., as a social-networking website). Its users may access social-networking system 522 using their client devices (e.g. clients 530).

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiments, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Computer System

Figure 6:
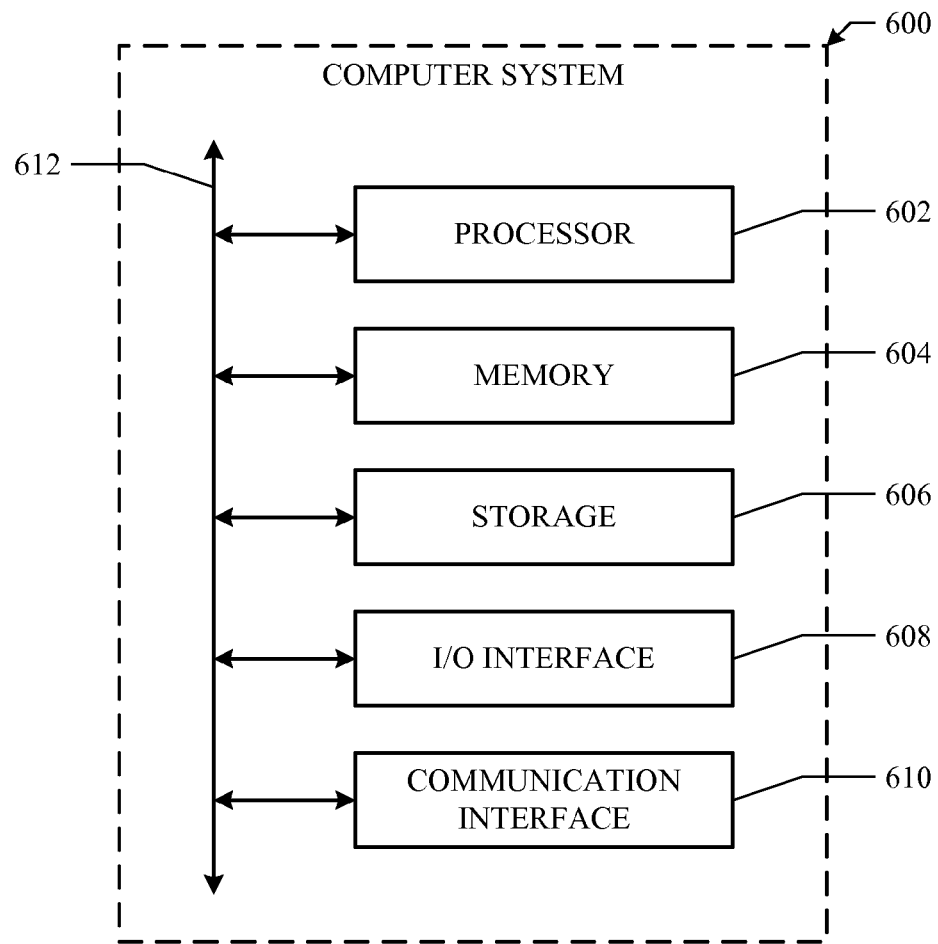
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by one or more computing devices, for one or more elements of information relating to a subject matter, wherein the elements of information have been shared among a plurality of users of a social-networking system:
    by one or more computing devices, for each element of information:
        calculating one or more first-order derivatives of a non-zero rate of sharing of the element of information;
        identifying, based at least in part on one or more of the first-order derivatives, one or more increases in the non-zero rate of sharing of the element of information among the users, wherein each of the increases comprises a first number of shares of the element of information over a first period of time being less than a second number of shares of the element of information over a second period of time following the first period of time; and
        identifying, from the plurality of the users of the social-networking system, one or more first users who caused one or more of the increases in the non-zero rate of sharing, wherein each of the first users shared the element of information at one or more times respectively associated with one or more of the increases in the non-zero rate of sharing; and
    by one or more computing devices, identifying one or more influencers associated with the subject matter from the first users identified for one or more of the elements of information.

2. The method of claim 1, wherein for one or more of the elements of information, identifying the first users comprises identifying the first users who caused the non-zero rate of sharing of the element of information to locally increase significantly.

3. The method of claim 1, wherein identifying one or more of the influencers comprises:
    for one or more of the first users:
        determining a total number of elements of information for which the first user is identified; and
        if the total number of elements of information is greater than or equal to a threshold, then selecting the first user as one of the influencers.

4. The method of claim 1, further comprising:
    surveying one or more of the users of the social-networking system to identify one or more potential experts associated with the subject matter; and
    selecting, from the potential experts, one or more experts associated with the subject matter.

5. The method of claim 1, wherein for one or more of the elements of information:
    one or more instances of the element of information are included in a set of information; and
    each instance of the element of information corresponds to where the element of information is shared by one or more of the users.

6. The method of claim 5, further comprising:
    for one or more of the elements of information, tracing backward a sharing process of the element of information through the instances of the element of information to identify a second user who shared an initial instance of the element of information; and
    identifying one or more experts associated with the subject matter from the second user identified for the element of information.

7. The method of claim 6, wherein identifying the experts comprises:
    for one or more of the second users:
        determining a total number of elements of information for which the second user is identified; and
        if the total number of elements of information is greater than or equal to a threshold, then selecting the second user as one of the experts.

8. The method of claim 5, further comprising:
for one or more of the elements of information, tracing backward a sharing process of the element of information through the instances of the element of information to locate an initial instance of the element of information;
identifying one of the influencers who is closest to the initial instance of the element of information along the sharing process of the element of information;
identifying a second user who is directly connected to the one of the influencers within the social-networking system as an author of the element of information; and
identifying one or more experts associated with the subject matter from the second user identified for the element of information.

9. The method of claim 5, further comprising:
for one or more of the elements of information, tracing backward a sharing process of the element of information through the instances of the element of information to identify a second user who shares an initial instance of the element of information;
for one or more of the influencers, determining a number of connections between the influencer and the second user identified for at least one element of information within the social-networking system; and
grouping the influencers based on the number of connections determined for the influencers.

10. The method of claim 1, further comprising:
identifying the subject matter; and
selecting, from information shared by the users of the social-networking system, the elements of information relating to the subject matter to form a set of information.

11. A system comprising:
one or more processors; and
a memory coupled to the processors comprising instructions executable by the processors, the processors being operable when executing the instructions to:
for one or more elements of information relating to a subject matter, wherein the elements of information have been shared among a plurality of users of a social-networking system:
calculate one or more first-order derivatives of a non-zero rate of sharing of the element of information;
identify, based at least in part on one or more of the first-order derivatives, one or more increases in the non-zero rate of sharing of the element of information among the users, wherein each of the increases comprises a first number of shares of the element of information over a first period of time being less than a second number of shares of the element of information over a second period of time following the first period of time; and
identify, from the plurality of the users of the social-networking system, one or more first users who caused one or more of the increases in the non-zero rate of sharing, wherein each of the first users shared the element of information at one or more times respectively associated with one or more of the increases in the non-zero rate of sharing; and
identify one or more influencers associated with the subject matter from the first users identified for one or more of the elements of information.

12. The system of claim 11, wherein for one or more of the elements of information, identifying the first users comprises identifying the first users who caused the non-zero rate of sharing of the element of information to locally increase significantly.

13. The system of claim 11, wherein identifying one or more of the influencers comprises:
for one or more of the first users:
determine a total number of elements of information for which the first user is identified; and
if the total number of elements of information is greater than or equal to a threshold, then select the first user as one of the influencers.

14. The system of claim 11, wherein the processors are further operable when executing the instructions to:
survey one or more of the users of the social-networking system to identify one or more potential experts associated with the subject matter; and
select, from the potential experts, one or more experts associated with the subject matter.

15. The system of claim 11, wherein for one or more of the elements of information:
one or more instances of the element of information are included in a set of information; and
each instance of the element of information corresponds to where the element of information is shared by one or more of the users.

16. The system of claim 15, wherein the processors are further operable when executing the instructions to:
for one or more of the elements of information, trace backward a sharing process of the element of information through the instances of the element of information to identify a second user who shared an initial instance of the element of information; and
identify one or more experts associated with the subject matter from the second user identified for the element of information.

17. The system of claim 16, wherein identifying the experts comprises:
for one or more of the second users:
determine a total number of elements of information for which the second user is identified; and
if the total number of elements of information is greater than or equal to a threshold, then select the second user as one of the experts.

18. The system of claim 15, wherein the processors are further operable when executing the instructions to:
for one or more of the elements of information, trace backward a sharing process of the element of information through the instances of the element of information to locate an initial instance of the element of information;
identify one of the influencers who is closest to the initial instance of the element of information along the sharing process of the element of information;
identify a second user who is directly connected to the one of the influencers within the social-networking system as an author of the element of information; and
identify one or more experts associated with the subject matter from the second user identified for the element of information.

19. The system of claim 15, wherein the processors are further operable when executing the instructions to:
for one or more of the elements of information, trace backward a sharing process of the element of information through the instances of the element of information to identify a second user who shares an initial instance of the element of information;
for one or more of the influencers, determine a number of connections between the influencer and the second user identified for at least one element of information within the social-networking system; and group the influencers based on the number of connections determined for each influencer.

20. The system of claim 11, wherein the processors are further operable when executing the instructions to:
identify the subject matter; and
select, from information shared by the users the social-networking system, the elements of information relating to the subject matter to form a set of information.

21. One or more computer-readable non-transitory storage media embodying software that is operable when executed to:
for one or more elements of information relating to a subject matter, wherein the elements of information have been shared among a plurality of users of a social-networking system:
calculate one or more first-order derivatives of a non-zero rate of sharing of the element of information;
identify, based at least in part on one or more of the first-order derivatives, one or more increases in the non-zero rate of sharing of the element of information among the users, wherein each of the increases comprises a first number of shares of the element of information over a first period of time being less than a second number of shares of the element of information over a second period of time following the first period of time; and
identify, from the plurality of users of the social-networking system, one or more first users who caused one or more of the increases in the non-zero rate of sharing, wherein each of the first users shared the element of information at one or more times respectively associated with one or more of the increases in the non-zero rate of sharing; and
identify one or more influencers associated with the subject matter from the first users identified for one or more of the elements of information.

22. The media of claim 21, wherein for one or more of the elements of information, identifying the first users comprises identifying the first users who caused the non-zero rate of sharing of the element of information to locally increase significantly.

* * * * *